(12) United States Patent
Ni et al.

(10) Patent No.: US 8,843,468 B2
(45) Date of Patent: Sep. 23, 2014

(54) CLASSIFICATION OF TRANSACTIONAL QUERIES BASED ON IDENTIFICATION OF FORMS

(75) Inventors: Xiaochuan Ni, Beijing (CN); Jian-tao Sun, Beijing (CN); Zheng Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 64 days.

(21) Appl. No.: 12/948,846

(22) Filed: Nov. 18, 2010

(65) Prior Publication Data
US 2012/0130967 A1    May 24, 2012

(51) Int. Cl.
G06F 17/30    (2006.01)

(52) U.S. Cl.
CPC .............................. *G06F 17/30657* (2013.01)
USPC ......................................... 707/708; 707/710

(58) Field of Classification Search
USPC ........... 707/705–706, 999.003–999.005, 708, 707/710
See application file for complete search history.

(56) References Cited

U.S. PATENT DOCUMENTS

| | | | |
|---|---|---|---|
| 7,366,723 B2 * | 4/2008 | Shaburov | 1/1 |
| 2005/0060290 A1 | 3/2005 | Herscovici et al. | |
| 2006/0047637 A1 * | 3/2006 | Meyerzon et al. | 707/3 |
| 2007/0136263 A1 | 6/2007 | Williams | |
| 2008/0033953 A1 | 2/2008 | Vaithyanathan et al. | |
| 2008/0059508 A1 | 3/2008 | Lu et al. | |
| 2009/0070300 A1 * | 3/2009 | Bartels et al. | 707/3 |
| 2009/0228353 A1 | 9/2009 | Achan et al. | |
| 2009/0259632 A1 | 10/2009 | Singh | |
| 2009/0307205 A1 | 12/2009 | Churchill et al. | |

OTHER PUBLICATIONS

Amar Kumar Dani; "Automatic Identification of user goals in web search based on classification of click-through results" by Department of Computer Science & Engineering, Indian Institute of Technology, dated May 2008, 66 pages.*

Liu et al.; "Automatic Query Type Identification Based on Click Through Information"; AIRS 2006, LNCS 4182; pp. 509-600; Springer-Veriag Berlin Heidelberg 2006.*

Sun, et al., "CubeSVD: A Novel Approach to Personalized Web Search", Retrieved at << http://www.www2005.org/cdrom/docs/p382.pdf>>, May 10-14, 2005, pp. 382-390.

Kang, In-Ho, "Transactional Query Identification in Web Search", Computing LAB, Samsung Advanced Institute of Technology, Retrieved at << http://citeseerx.ist.psu.edu/viewdoc/download-?doi=10.1.1.84.4753&rep=rep1&type=pdf>>, 2005, pp. 13.

Jansen, et al., "Determining the informational, navigational, and transactional intent of Web queries", Retrieved at <<http://ist.psu.edu/faculty_pages/jjansen/academic/pubs/jansen_user_intent.pdf >>, Information Processing and Management 44, 2008, pp. 1251-1266.

(Continued)

*Primary Examiner* — Monica Pyo
(74) *Attorney, Agent, or Firm* — Doug Barker; Carole Boelitz; Micky Minhas

(57) ABSTRACT

A method for identifying transactional queries includes associating user queries with forms clicks on by users who employ a search engine to place the queries during query sessions. A score is assigned to each user query. The score reflects a likelihood that the respective query is a transactional query. The query is classified as a transactional query if the score exceeds a threshold value.

20 Claims, 3 Drawing Sheets

(56) References Cited

OTHER PUBLICATIONS

Mendoza, et al., "Building decision trees to identify the intent of a user query", Retrieved at << http://www.inca.inf.utfsm.cl/~juan/publications/KESeng-09.pdf >>, Proceedings of the 13th International Conference on Knowledge-Based and Intelligent Information and Engineering Systems, 2009, pp. 8.

Beitzel, et al., "Automatic Classification of Web Queries Using Very Large Unlabeled Query Logs", Retrieved at <<http://www.ir.iit.edu/publications/downloads/a9-beitzel.pdf>>, ACM Transactions on Information Systems, vol. 25, No. 2, Article 9, Apr. 2007, pp. 29.

Lee, et al., "Automatic Identification of User Goals in Web Search", WWW 2005, May 10-14, 2005, Chiba, Japan. Retrieved at << http://www.www2005.org/cdrom/docs/p391.pdf>>, May 10-14, 2005, pp. 391-400.

Dani, Amar Kumar, "Automatic Identification of user goals in web search based on classification of clickthrough results", Department of Computer Science & Engineering, Indian Institute of Technology, Kharagpur 721302, India, Retrieved at << http://www.cse-web.iitkgp.ernet.in/~abhij/facad/O3UG/Synopsis/03CS3014_Amar_Dani.pdf >>, May 2008, pp. 9.

* cited by examiner

Navigational:
    airtran
Informational:
    december 2009 cancun specials from kansas city
Transactional:
    airtran boston to aruba
    airtran reservations
    airtran flight status
    discount flights from wichita ks
    cheap tickets to west palm beach florida cheap airfare from [ san juan ] to [ flint ] [ one way ]

↓ Pattern Generalization cheap airfare from [from] to [to] [travel type]

[from]: atlanta ga, akron canton oh, ...
[to]: allentown pa, aruba aruba, ...
[travel type]: round trip, one way

FIG. 1

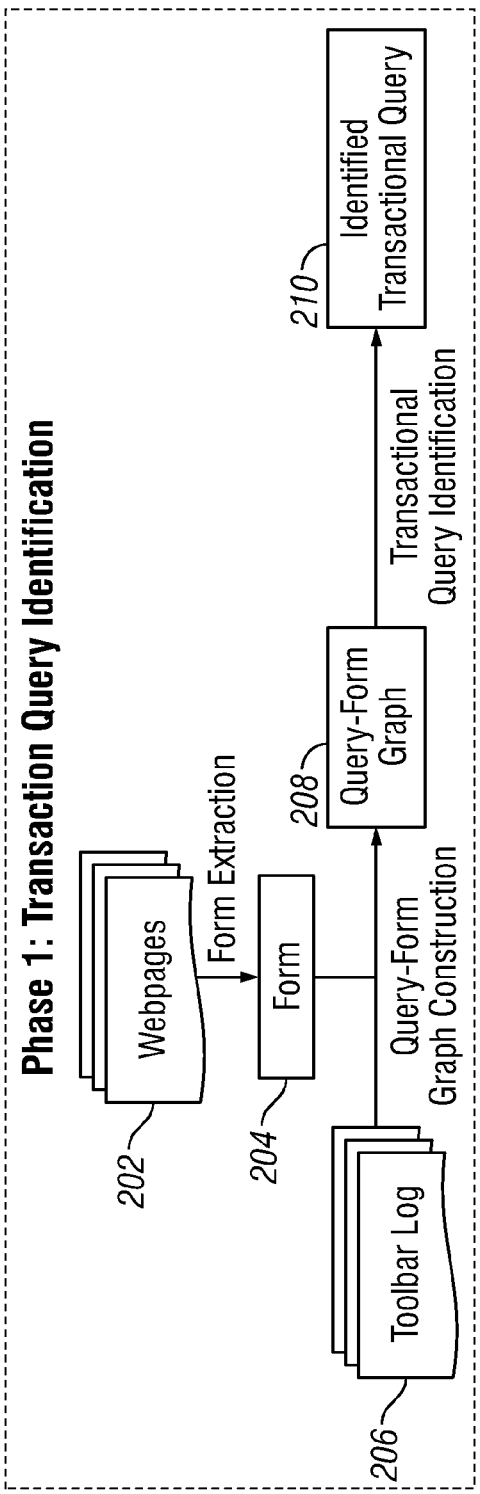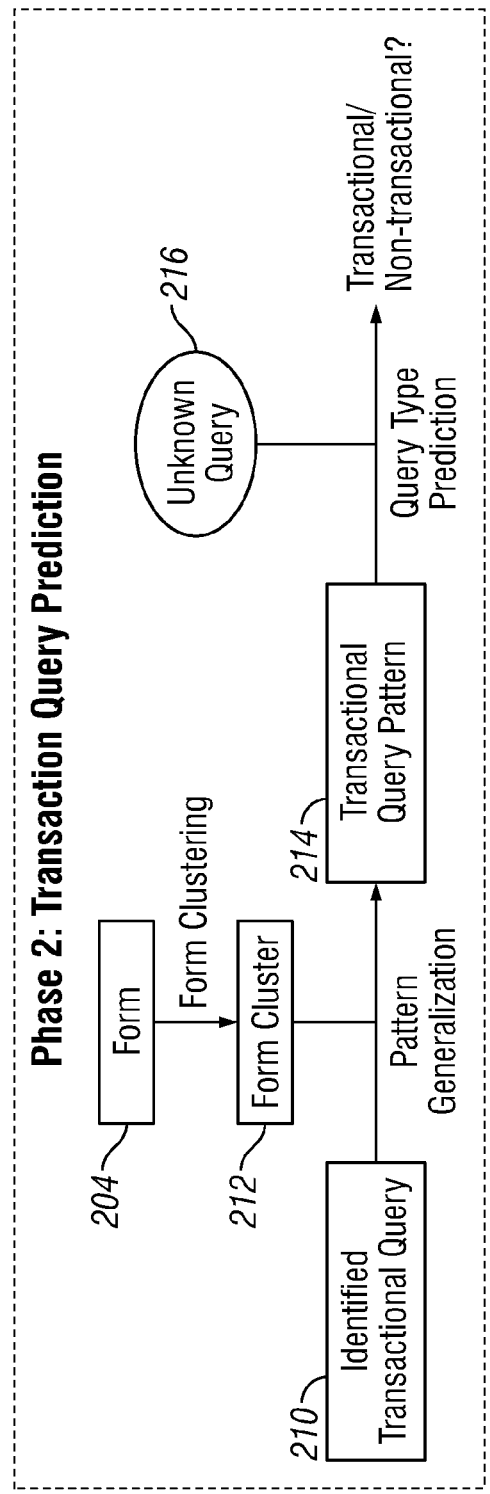

CLASSIFICATION OF TRANSACTIONAL QUERIES BASED ON IDENTIFICATION OF FORMS

BACKGROUND

It has become common for users of host computers connected to the World Wide Web (the "web") to employ web browsers and search engines to locate web pages having specific content of interest to users. A search engine, such as Microsoft Bing™, indexes tens of billions of web pages maintained by computers all over the world. Users of the host computers compose queries, and the search engine identifies pages or documents that match the queries, e.g., pages that include key words of the queries. These pages or documents are known as a result set. In many cases, ranking the pages in the result set is computationally expensive at query time.

Users may have a variety of intents while performing a search of the Web. For example, some users may already have in mind the site they want to visit when they enter a query, however, the users may not know the URL of the site or may not want to type in the full URL, and may rely on the search engine to present a link to the site they know they want to visit. Such queries may be referred to as navigational queries, i.e., queries in which the user already has an intended site in mind. An example of such a search arises when a user places a query in an attempt to find the homepage of Microsoft.

In other cases users may perform a search to find information about a subject. For example, the query "canon 5d review" can be regarded as informational, since users expect to find reviews and commentary concerning the Canon 5D camera. These queries may be referred to as informational queries. In yet other cases users may wish to perform transactions on a website. Such queries may be referred to as transactional queries. When a transactional query is placed, the user typically has some task or tasks to complete which may require actions or interactions with one or several websites. For example, the query "book Marriott hotel for my one week Hong Kong visit" can be regarded as transactional, because the user intent is to complete the task of booking a hotel room.

Because the user's intent affects the relevancy of the search requests, it would be helpful if the search engine could classify queries as being navigational, informational, or transactional. Such an ability could be helpful for improving the relevance of the search results that are presented to the user. Previous work has largely focused on classifying queries into informational and navigational categories. It would be helpful if transactional queries could be automatically identified as well.

SUMMARY

In a web-based or other online search session in which a transactional query is placed through a search engine, the user will often fill-out or otherwise interact with one or more forms that are made available on the pages of the search results. In one implementation, an automatic technique for classifying a search query as a transactional query is based on an analysis of the relationship between search queries and the online forms that are available from the pages listed in the search results for those queries. In some cases the technique contains two distinct phases. The first phase is a training phase in which previously executed search queries are analyzed using data available from users' toolbar logs. The search queries are extracted from the logs, along with a set of URLs associated with each query. The URLs represent those pages or documents that are available in the search results for each query. The pages corresponding to these URLs are then crawled on the web to extract any forms from them. After the forms are extracted, those forms which users have clicked on or otherwise accessed will be identified and associated with the query. From this information a query-form graph can be prepared. Based on the query-form graph, the likelihood that a particular query is a transactional query can be determined.

In the second phase, the query-form graph for the queries is examined to identify any patterns they may contain. The patterns are identified by a process that begins with the use of a clustering component, which is used to group forms that appear to be similar in nature and to group user input fields in those forms which appear to be similar. Each user input field has a label associated with it. The results of the clustering process are used to identify patterns in the queries that are identified as transactional queries in the first phase. When a new query is to be classified, its characteristics can be compared to the set of patterns that has been developed in the second phase. If there is a sufficient match between the query and one of the pre-identified patterns, the new query will be classified as a transactional query.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 shows an example of a form that a user has found after placing a transactional search query.

FIG. 3 summarizes the first phase of a process for identifying transactional queries.

FIG. 4 summarizes the second phase of a process for identifying transactional queries.

DETAILED DESCRIPTION

Figure 2:
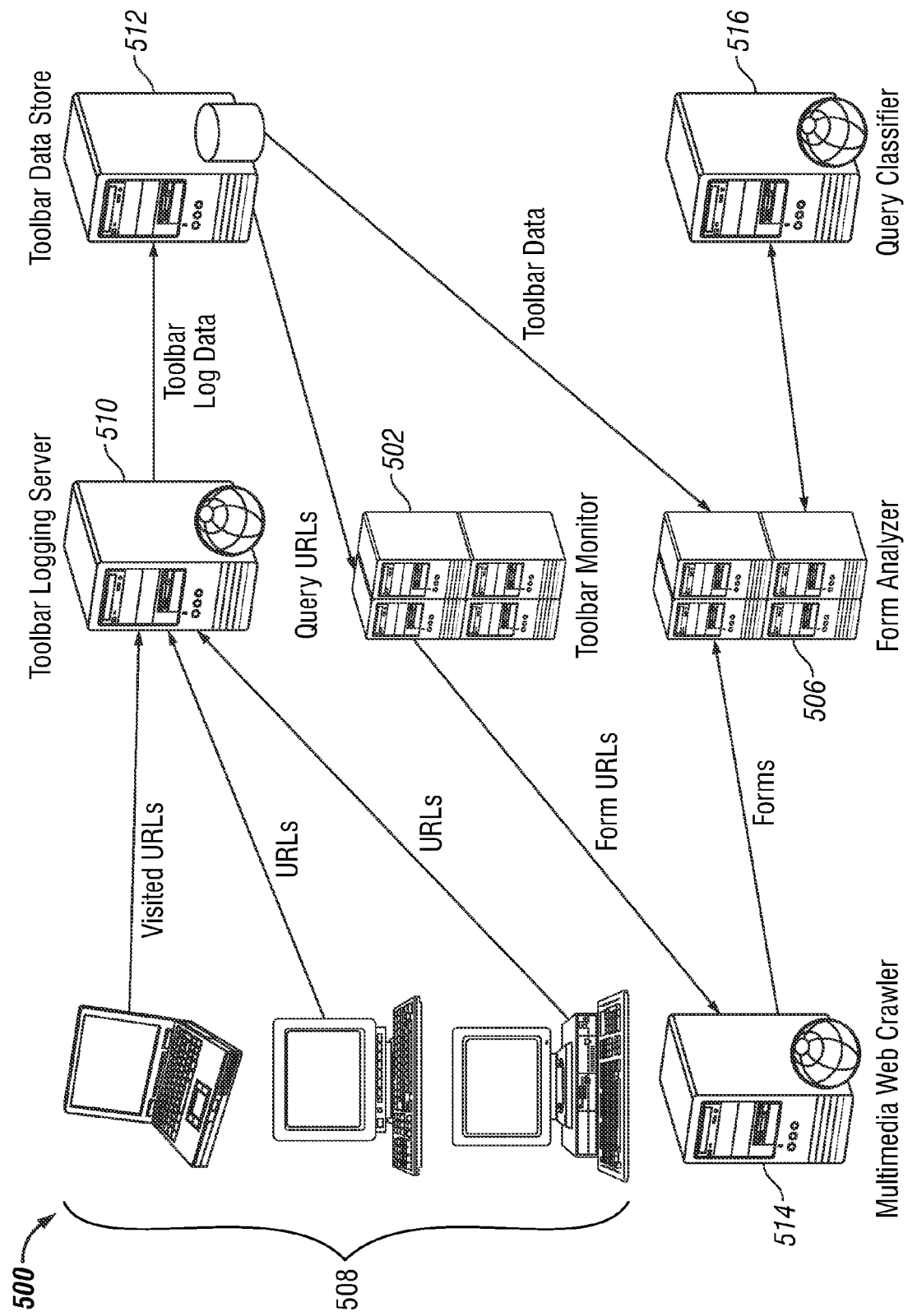
FIG. 2 shows one example of the operating environment in which the methods, techniques and systems described herein may be employed.

In a web-based or other online search session in which a transactional query is placed through a search engine, the user will often fill-out or otherwise interact with one or more forms that are made available on the pages of the search results. For example, a user may click on a link in one of the pages of the search results to access a form and then type information into one or more text boxes to fill out the form. Likewise, the user may select items from a dropdown list or click on a button to execute actions associated with the form. Interactions of these types are common when users perform an online transaction for a wide variety of purposes, e.g., booking a hotel or flight, buying movie tickets, or finding used car dealers.

FIG. 1 shows an example of a form that a user has found after placing a transactional search query. In this example the search query is "cheap airfare from san juan to flint one way." By examining user clicks available from toolbar click logs, it is possible to associate search queries with webpage forms. If a query is frequently associated with many forms from different web sites (i.e., corresponding with many form clicks), it is very likely that the query can be classified as a transactional query. This assumption is reasonable since online forms are a common and straightforward way for users to interact with the search results that are obtained when they are placing a transactional query.

As detailed below, an automatic technique for classifying a search query as a transactional query is based on an analysis of the relationship between search queries and the online forms that are available from the pages listed in the search results for those queries. The technique contains two distinct phases. The first phase is a training phase in which previously executed search queries are analyzed using data available from users' toolbar logs. The search queries are extracted from the logs, along with a set of URLs associated with each query. The URLs represent those pages or documents that are available in the search results for each query. The pages corresponding to these URLs are then crawled on the web to extract any forms from them. The pages clicked on or otherwise accessed by the users may each contain zero forms, one form, or multiple forms. Since users' clicks on forms will be used to identify transactional queries, only those queries in the toolbar log that are associated with at least one online form will be analyzed. After the forms are extracted, those forms which users have clicked on or otherwise accessed will be identified and associated with the query. From this information a query-form graph can be prepared. Based on the query-form graph, the likelihood that a particular query is a transactional query can be determined.

In the second phase, the query-form graph for the queries is examined to identify any patterns they may contain. The patterns are identified by a process that begins with the use of a clustering component, which is used to group forms that appear to be similar in nature and to group user input fields in those forms which appear to be similar. A user input field may be any field in which the user provides data. For instance, examples of user input fields include text, select, radio, checkbox and button fields. The text field refers to a text input box, the select field refers to a dropdown menu, the radio field refers to a one or more radio buttons, the checkbox field refers to a group of check boxes and the button field refers to a button that is typically used to submit the form. Each user input field has a label associated with it. For example, in FIG. 1, two of user input fields have the labels "From" and "To", respectively. User input fields will be grouped together if they have the same functionality, even if their labels differ. Similarly, forms will be grouped together if they are used to complete the same transaction, even if they differ in details.

The results of the clustering process are used to identify patterns in the queries that are classified as transactional queries in the first phase. When a new query is to be classified, its characteristics can be compared to the set of patterns that has been developed in the second phase. If there is a sufficient match between the query and one of the pre-identified patterns, the new query will be classified as a transactional query.

Toolbar data can be collected directly and/or collected and logged from users who, for example, select to participate in data sharing schemes such as opting into a customer experience improvement program. A wide range of data can be gathered from a search toolbar. For example, the data can include, but is not limited to, URLs visited by the user, URLs added to favorites, page print events, and/or the time taken to return to a search results list after visiting a link. The data can be logged locally and/or centrally and can be made available in substantially real time to a search engine operational environment and the like. Instances of the systems and methods herein can utilize, for example, URLs visited by the user to discover resources such as, for example, forms and related information.

FIG. 2 shows one example of the operating environment in which the methods, techniques and systems described herein may be employed. One example of the systems and methods herein, for example, can be implemented utilizing a toolbar logging server 510, toolbar data store 512, web crawler 514, form analyzer 506 and query classifier 516.

Toolbar data concerning online pages clicked on, visited or otherwise accessed by users are logged, for example, by users' search toolbars on computing devices 508 and communicated to a toolbar logging server 510. In turn, the toolbar logging server 510 provides selected data to a toolbar data store 512 which can include a server farm that stores and manages toolbar data for reporting purposes. A toolbar monitor 502 inspects the toolbar data store 512, identifying, for example, URLs. The identified URLs are then passed to a web crawler 514 which examines the sites or pages at those URLs in order to extract forms associated with those sites. The web crawler 514 may maintain a store of previously visited URLs—if a URL has not been previously visited or requires revisiting, the web crawler 514 retrieves the online resource, which in this case are the forms associated with the pages that have been visited by the users. The form analyzer 504 inspects the retrieved forms and matches them to the queries available from the toolbar log provided by the toolbar data store 512 to thereby form the query-form graph. The form analyzer 504 may also generate the patterns which will be used to determine if unclassified queries should be classified as transactional queries. Alternatively, the patterns may be generated by a separate pattern generator (not shown). Finally, a query classifier 516 examines unclassified queries and compares them to the pre-identified patterns available from the form analyzer 504 and determines if there is a sufficient match to one of the patterns to classify the query as a transactional query.

The various phases of the process summarized above will now be discussed in more detail.

Phase 1

The first phase of the process begins with form extraction. This can be accomplished by parsing the HTML codes of the pages extracted by the web crawler 514. A form can be identified by any suitable pair of HTML tags. For instance, most straightforwardly, all the content between the html tags "<form>" and "</form>" may be treated as forms. Of course, other tags may be used to identify forms as well.

A form may be treated as a container for user input fields. Each field allows users to interact with the form by, e.g. filling in some values or selecting a value from a pre-set list.

A user input field has three properties: a label, a type and a list of values. The label is a descriptor for field. As previously mentioned, user input fields may come in a variety of different types, including, for instance, text, select, radio, checkbox and button field types. Finally, each user input field typically accommodates some pre-defined values that are entered or selected by the user, such as a date, name, number etc.

A form has four properties: a label to describe the form, a collection of user input fields contained in the form, a "from-url," which is the URL of the page or site containing the form, and a "to-url," which is the URL to which users are directed after the form is submitted.

A query-form graph is constructed by mining the toolbar log data from multiple users. After a user submits a query to a search engine a record is created in the toolbar log. The record for each of the users generally includes the following elements:

<User id, Query, Query submission timestamp, Clicked result page (URL), Click timestamp, Arrive clicked page timestamp, Further Clicked Page (URL), Arrive further clicked page timestamp>

The Further Clicked Page (URL) may be a form or it may be a subsequent page that is accessed through the clicked result page, in which case the form may be available from the subsequent web page or even from another web page linked to the subsequent web page. Assuming that the form corresponds to the Further Clicked Page (URL), the relationship between a query and an online form can be identified. A bipartite graph of the query and form can be constructed by connecting the query node and the form node with an edge when there is a click between them. The frequency of clicks is used as the weight of the edge.

Based on the query-form graph that is produced from the toolbar log of a series of users, a variety of different score functions may be used to measure the likelihood that a particular query is a transactional query. By way of example, two score functions are presented herein to illustrate the process. These score functions are the click entropy and the click ratio.

The click entropy score function may be based on the click entropy at the level of the clicked pages or websites included in the search results as well as at the level of the forms that are clicked on within those pages or websites. The click entropy score function may be defined as follows:

$$ClickEntropy(q) = (1 + E(p_{site})) \sum_{s_i \in Site(q)} \frac{Click(q, s_i)}{Click(q)} \frac{1}{2^{E(p_{s_i})}}$$

Where $P_{site}$ is the click distribution at the page or website level and $p_{s_i}$ is the click distribution at the level of the forms inside the website $s_i$. Site(q) denotes the set of websites on which q has user form clicks. Click(q,$s_i$) refers to the click frequency on forms in website $s_i$. Click(q) is the total frequency of user form clicks. E(p) is the entropy computed on distribution p.

The larger the ClickEntropy(q), the more likely it is that query q is transactional. As an illustration, assume there are three queries q1, q2 and q3. For query q1, users generally go to one specific website and interact with a single form on that website. This query is very likely a transactional query. For query q2, users generally go to a common website but interact with many forms on that website. Such a query may be a navigational query, even though it is associated with many forms. The query "american airlines" is an example of such a navigational query. Query q3 is associated with many forms that are obtained from different websites. Most likely such a query is a transactional query. An example of query q3 is "cheap flight to seattle". If the score function ClickEntropy(q) is applied to these three queries it will rank them as follows: ClickEntropy(q3)>ClickEntropy(q1)>ClickEntropy(q2), where a higher score indicates that a query is more likely a transactional query. That is, in this example the query q3 has the highest probability of being a transactional query and query q2 the lowest probability.

The click ratio score function may be defined by:

$$ClickRatio(q) = \log_2\left(\frac{Click(q)}{Impression(q)} + 1\right)$$

where click(q) is the frequency of query q associated with form clicks, while Impression(q) is the impression number of q in the log data. The click ratio score function can be used to distinguish between informational queries and transactional queries.

The two score functions defined above then may be used to estimate how likely it is that a query is transactional. In reality, the query-form click graph is noisy, e.g., false clicks made by users can also be recorded in the toolbar log. Furthermore, not all forms extracted from websites can be considered as the starting point of a transaction. For instance, a form containing a search box and a click button does not indicate the query is a transaction query. To address this problem an iterative algorithm may be used to rank the queries and forms according to how likely they are to be transactional in nature. The algorithm is based on the mutual reinforcement principle: a transactional query is usually associated with transactional forms. A transactional form is usually associated with transactional queries.

Based on the query-form relations encoded by the bipartite graph, the transactional scores for the query, Score(q), and the form, Score(f), are updated iteratively, in accordance with the following formula:

$$Score_{k+1}(q_i) = ClickEntropy(q_i) \times ClickRatio(q_i) \times \ln\left(\sum_{f_j \in F(q_i)} Click(q_i, f_j) Score_k(f_j) + 1\right)$$

$$Score_{k+1}(f_j) = \ln\left(\sum_{q_i \in F(f_j)} Click(q_i, f_j) Score_k(q_i) + 1\right)$$

where $F(q_j)$ is the set of forms associated with $q_j$. $Q(f_j)$ is the set of queries associated with $f_j$. Click($q_i,f_j$) is the frequency of $q_i$ clicking on $f_j$. The algorithm terminates when the scores for queries and forms converge. Queries with a score above a threshold value will be treated as transactional queries.

FIG. 3 summarizes the first phase of the process discussed above. As shown, forms 204 are extracted from online pages or documents (e.g., webpages 202). The forms 204 are compared with the log data obtained from the toolbar log 206 to create a query-form graph 208. The query-form graph 208 is analyzed by any of a variety of techniques to assign a score to each query which reflects the likelihood that it is transactional in nature. Queries with a score above a threshold value are treated as transactional queries 210.

Phase 2

The second phase of the process analyzes the queries that have been identified as transactional queries in the first phase of the process are examined to find any patterns in them that may be representative of a transactional query. In this way patterns in an unclassified query can be compared to the pre-identified patterns and if the patterns are sufficiently similar, the unclassified query can be treated as a transactional query. The analysis includes two steps: form clustering and pattern generalization.

In the form clustering step, user input fields in different forms that have the same functionality are grouped together. Likewise, different forms that are used to complete similar transactions are grouped together. Clustering algorithms that perform such tasks are well known and do not need to be discussed in detail.

In the pattern generalization step, the query string is compared to the values that been inserted into the user input fields of the forms. For example, in the form shown in FIG. 1, the query string is "Cheap airfare from san juan to flint one way." In this example the query sub-strings "san juan" and "flint" can be found in the "From" and "To" user input fields, respectively. If a query's sub-string can be matched with the value of a user input field, as in FIG. 1, the sub-string will be replaced by the corresponding slot name and then we can have a candidate pattern. This is shown in FIG. 1 where the query sub-string "san juan" is replaced with "From" and the query sub-string "flint" is replaced with "To." As a result a candidate pattern is identified.

In order to get more candidate patterns, the user input field clustering results and the form clustering results may be used. When the user input field clustering results are used, an expanded list of values for each user input field is available. When the form clustering results are used, not only will fields in the clicked form be used to generate patterns, but all the fields in any form within the same cluster or group will be used to generate patterns. Finally one set of candidate patterns have been identified, all identical patterns are merged and a confidence score is calculated for each pattern as follows:

$$ScorePattern(p) = |\text{Field}(p)| \sum_{q_i \in Q(p)} Score(q_i)$$

where p is a pattern, Q(p) is the set of transactional queries which can be generalized to p, and Score($q_i$) is the transaction score of query $q_i$, which was computed in Phase 1. |Field(p)| is number of user interface fields in pattern p. Intuitively, the score will indicate that a pattern is better in quality if the queries from which they are generalized are better in quality. Moreover, a pattern will more likely be representative of a transactional pattern if more of users' informational requirements can be included in the pattern, which is indicated by the use of more fields in the pattern.

At this point a set of predetermined query-form patterns has been generated. This set can be used to predict whether or not an unclassified query is a transactional query. The quality of the predetermined query-from patterns as well as the quality of the fit between the unclassified query and one of the patterns will be taken into account when making the prediction. After a list of transactional query patterns are collected, the predetermined query-form pattern than best matches the unclassified query q can be found using:

$$p_{fit} = \text{argmax}_{p_i \in P} \text{Fit}(p_i, q)$$

where $p_i$ is a predetermined query-form pattern representative of a transactional query and P is the set of all predetermined patterns. The Fit($p_i$,q) indicates how well the query q fits the pattern $p_i$.

The following formula may then be used to calculate a transactional score for q:

$$ScoreQ(q) = \text{Fit}(p_{fit}, q) ScorePattern(p_{fit})$$

The larger the ScoreQ(q), the more likely the query q is transactional in nature. In practical applications, a score above some threshold value can be used to classify query q as transactional or not-transactional.

In order to determine the fitness of an unclassified query to a given pattern, the values of the user interface fields associated with the pattern can be matched to sub-strings in the query. If the match is successful, the substring will be removed from the query. Finally, the textual similarity between the pattern and remaining sub-strings in of the query will be determined. The fitness measurement between the query and one of the predetermined patterns will take into account both the number of successful matches and the textual similarity, as shown in the following formula:

$$\text{Fit}(p, q) = \frac{FieldMatch(p, q)}{|\text{Field}(p)|} \text{Cosine}(p', q')$$

where FieldMatch(p,q) is the number of user input fields matches that have been found between the pattern p and the query q. |Field(p)| is the number of fields in pattern p. p' and q' refer to the remaining text after the matched fields are removed. The Cosine similarity is computed using their bags-of-words representations.

FIG. 4 summarizes the second phase of the process discussed above. As shown, form clusters 212 are created from the forms 204 based on the similarity of the forms and the user input fields included in those forms. The criteria for similarity may vary, and examples of such criteria have been presented above. Next, the pre-identified transactional queries 210 found in phase 1 are compared to the values in the user input fields of the form clusters 212 in order identify predetermined query-form patterns which are indicative of a transactional query. Finally, unclassified queries are examined. By comparing the unclassified queries 216 to the predetermined query-form patterns, the likelihood that an unclassified query 216 is a transactional query can be predicted.

As used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a machine-readable computer program accessible from any computer-readable storage device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for identifying transactional queries comprising:
   examining a plurality of executed queries to identify a plurality of URLs associated with the executed queries;
   passing the URLs to a web crawler to extract a plurality of forms that users have clicked on;
   associating the extracted forms with the corresponding executed queries;
   generating a query-form graph based on the extracted forms and corresponding executed queries;
   examining the query-form graph to identify a plurality of query-form patterns for predicting whether an unclassified query is a transactional query;

receiving an unclassified query of unknown type;
  comparing the received query to the plurality of query-form patterns, wherein the comparing comprises:
    matching sub-strings in the received query with labels associated with user input fields in the extracted forms;
    removing the matching sub-strings from the received query; and
    selecting a first query-form pattern from the plurality of query-form patterns that is a best match to the received query; and
      classifying the received query as a transactional query if the comparison satisfies at least one pre-established criterion.

2. The method of claim 1 wherein generating a query-form graph based on the extracted forms and corresponding executed queries comprises generating a bipartite query-form graph by connecting a query node and a form node with an edge for each extracted form clicked on by one of the users.

3. The method of claim 2 further comprising calculating a frequency of clicks.

4. The method of claim 3 further comprising using the calculated frequency of clicks to weight one or more edges of the bipartite query-form graph.

5. The method of claim 1 wherein comparing the received query to the plurality of query-form patterns further comprises determining a textual similarity between sub-strings remaining in the received query and sub-strings included in the executed queries of the query-form patterns.

6. The method of claim 1 wherein examining the query-form graph to identify a plurality of query-form patterns comprises identifying query-form patterns by grouping together user input fields in different extracted forms that have the same functionality.

7. The method of claim 6 wherein extracted forms have the same functionality if they are used to complete the same transaction.

8. The method of claim 1, further comprising assigning a score to each executed query, the score reflecting a likelihood that the executed query is a transactional query.

9. The method of claim 8, wherein the assigned score is based on a score function that depends at least in part on a distribution of search results associated with each executed query.

10. The method of claim 9, wherein the score function further depends at least in part on a distribution of forms clicked on by the users which are accessed through hyperlinks available in the search results.

11. The method of claim 1 wherein passing the URLs to a web crawler to extract a plurality of forms that users have clicked on comprises parsing pages clicked on by the users to identity prescribed html tags in the pages.

12. The method of claim 1 wherein the URLs are obtained from click logs.

13. A device comprising:
  a processor; and
  executable instructions operable by the processor, the executable instructions comprising a method for identifying transactional queries, the method comprising:
    examining a plurality of user queries to identify a plurality of URLs associated with the user queries;
    passing the identified URLs to a web crawler to extract a plurality of forms that user have clicked on;
      associating the extracted forms with the respective user queries;
      generating a query-form graph based on the extracted forms and corresponding user queries;
      examining the query-form graph to identify a plurality of query-form patterns for predicting whether an unclassified query is a transactional query;
      receiving an unclassified query of unknown type;
      comparing the received query to the plurality of query-form patterns, wherein the comparing comprises:
        matching sub-strings in the received query with labels associated with user input fields in the extracted forms;
        removing the matching sub-strings from the received query; and
        selecting a first query-form pattern from the plurality of query-form patterns that is a best match to the received query; and
      classifying the received query as a transactional query if the comparison satisfies at least one pre-established criterion.

14. The device of claim 13 wherein the method further comprises assigning a score to each user query, the score reflecting a likelihood that the user query is a transactional query.

15. The device of claim 14 wherein the score is based on a score function that depends at least in part on an entropy value computed for a distribution of search results associated with each user query and a distribution of forms clicked on by the users.

16. The device of claim 13 wherein comparing the received query to the plurality of query-form patterns further comprises determining a textual similarity between sub-strings remaining in the received query and sub-strings included in the user queries of the query-form patterns.

17. A computer-readable medium not comprising a propagated data signal and including computer-readable instructions for identifying search engine queries that are transactional in nature, said computer-readable instructions when executed by one or more processing devices perform a method for identifying transactional queries, the method comprising:
  examining a plurality of executed queries to identify a plurality of URLs associated with the executed queries;
  passing the URLs to a web crawler to extract a plurality of forms that users have clicked on;
  associating the extracted forms with the corresponding executed queries;
  generating a query-form graph based on the extracted forms and corresponding executed queries;
  examining the query-form graph to identify a plurality of query-form patterns for predicting whether an unclassified query is a transactional query;
  receiving an unclassified query of unknown type;
  comparing the received query to the plurality of query-form patterns, wherein the comparing comprises:
    matching sub-strings in the received query with labels associated with user input fields in the extracted forms;
    removing the matching sub-strings from the received query; and
    selecting a first query-form pattern from the plurality of query-form patterns that is a best match to the received query; and
  classifying the received query as a transactional query if the comparison satisfies at least one pre-established criterion.

18. The computer-readable medium of claim 17 wherein the method further comprises assigning a score to each executed query, the score reflecting a likelihood that the executed query is a transactional query.

19. The computer-readable medium of claim 18 wherein the assigned score is based on a score function that depends at least in part on a distribution of search results associated with each executed query.

20. The computer-readable medium of claim 19, wherein the score function further depends at least in part on an entropy value computed for the distribution of search results and a distribution of forms clicked on by the users.

* * * * *